June 18, 1963   M. E. LINDSAY   3,093,950
LUG FOR DOFFER WHEEL
Filed March 6, 1961
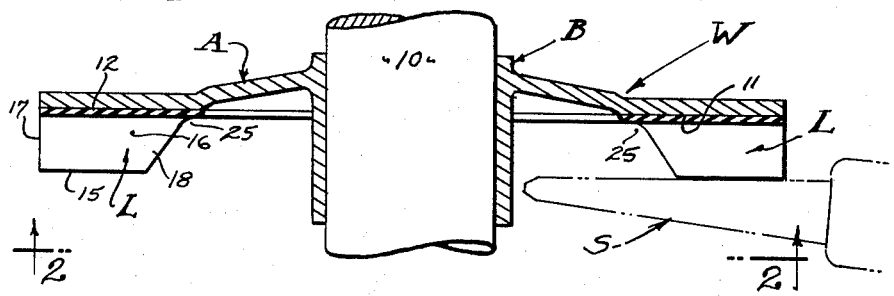
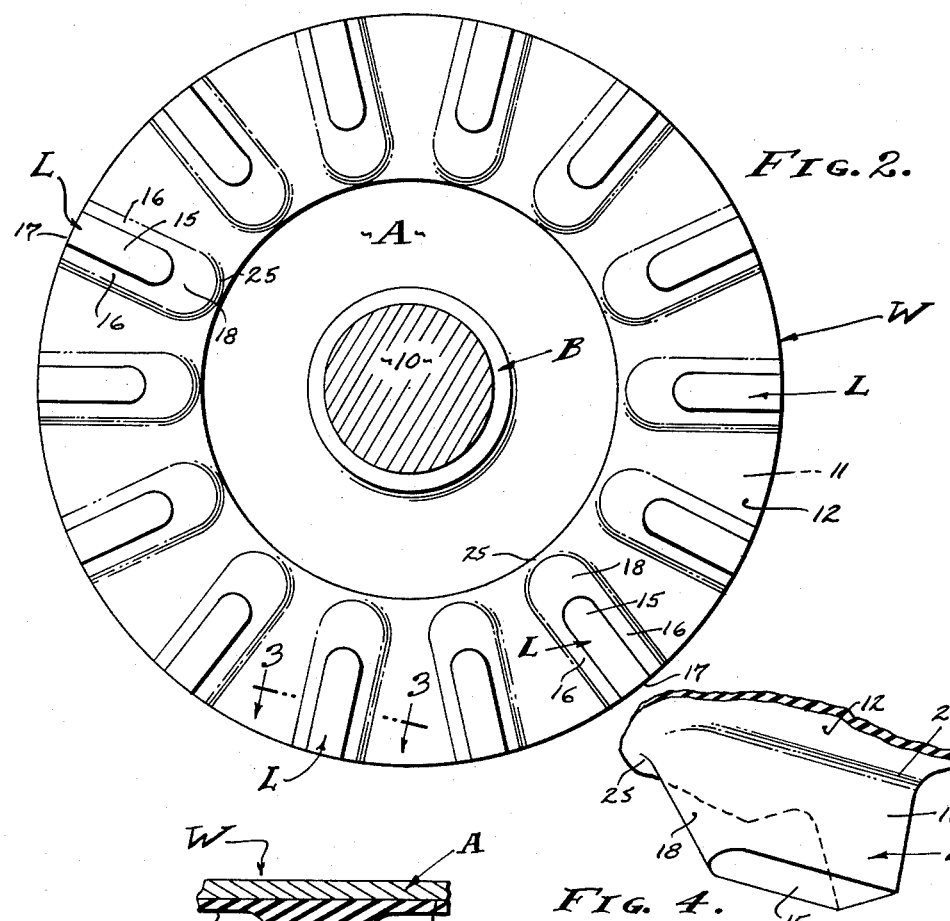
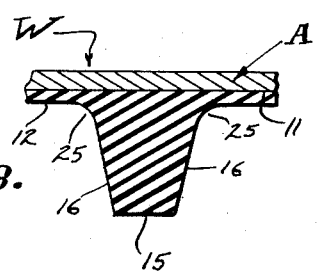
INVENTOR.
MAURICE E. LINDSAY
BY
AGENT 3,093,950
LUG FOR DOFFER WHEEL
Maurice E. Lindsay, Bakersfield, Calif., assignor, by mesne assignments, to Spindle Specialty Co., Bakersfield, Calif., a corporation of California
Filed Mar. 6, 1961, Ser. No. 93,674
4 Claims. (Cl. 56—41)

This invention relates, generally, to cotton picking machines and to the wheels that doff the cotton from the spindles, and is specifically concerned with the shape of the lugs that are provided on said wheels, it being a general object of this invention to provide an improved doffer wheel that will upgrade the cotton picked by cotton picking machines.

The art of cotton picking involves a machine that moves forwardly through the ripened cotton crop, between the rows of cotton plants. The machine has picking heads that comprise spindles and doffers, said spindles acting to pull the cotton from the plants, and the doffers acting to remove the picked cotton from the spindles, after which pneumatic means withdraws the picked cotton from the picking head. The spindles are rotating elements that penetrate the cotton plant, there being barbs on the spindles that catch the cotton fibers, to the end that the cotton wraps onto the spindles. The doffer wheels are also rotating elements that operate at a greater peripheral speed than the spindles operate, and that contact the cotton wrapped onto the spindles, to the end that the cotton is pulled from and thrown off of the spindles.

The doffer wheels, which is the subject of this invention, are generally accepted in their ordinary form but they are not altogether satisfactory. These wheels are characteristically a disc supported by a central hub and with a series of circumferentially spaced lugs. Further, the said lugs are formed of soft, pliant and resilient material, rubber or the like being employed in constructing these lugs. The ordinary accepted formation of lug is characterized by its geometry involving a flat-sided configuration with rather sharp corners. Of course, these corners, especially the outside corners, are rounded off during use of the wheel, however, it is these rather sharp corners that have an adverse effect resulting in a downgrading of the cotton that is picked.

The above mentioned downgrading of picked cotton results from packing and collection of cotton fibers and debris at the inside corners of the lugs, where the cotton adheres and packs, due to centrifugal forces, etc., and collects dirt. Thus, from time to time this packed collection of cotton fibers and dirt loosens and is thrown off, and is later baled with the main body of picked cotton. The said packing and collection of dirty cotton is promoted by the use of wetting agents, or lubricants, necessary in the operation of the usual cotton picking machines, to wet the spindles for proper picking function. As a result, wetted cotton fibers readily pack into the sharp inside corners of the lugs where they collect dust and become dirty. Obviously, any such collection will be thrown off eventually by the action of centrifugal force, and the collected oils and dirt will penetrate the otherwise clean cotton when baled therewith.

Another disadvantage of the usual doffer wheels is that fractures often develop and this results in the lugs tearing off. Since the usual doffer wheel is characterized by its sharp corners, especially the inside corners, fissures and cracks are readily started and gradually widen, this action being characteristic of rubber, or like material, when it ages and hardens. Obviously, any irregularity will catch cotton fibers and will harbor deposits, and therefore, in addition to making the structure mechanically weak as time passes these cracks add to the contamination of the cotton that is picked.

An object of this invention is to construct a doffer wheel lug that resists the development of cracks and fissures, with the result that the lugs do not as readily tear off and there are no cracks or fissures to collect cotton, dirt and oils. In practice, fracturing at the inside corners and tearing off of the lugs is virtually eliminated.

An object of this invention is to form the lugs of a doffer wheel, for cotton picking machines, in such a manner that packing of cotton fibers and the collection of dirt and oils is virtually eliminated.

More specifically, it is an object of this invention to provide a doffer wheel that will not allow packing of fibers therein and which thereby eliminates the collection of dirt and oils, or wetting agents, that ordinarily contaminate the picking of cotton.

It is an object of this invention to provide a doffer wheel of the character referred to that has no geometrical features that ordinarily characterize such wheels so as to allow the packing and collection of fibers and foreign materials. With the structure that I provide the ordinary sharp corners, that is the sharp inside corners, are replaced with generous fillets, all to the end that downgrading by the above mentioned contamination is completely avoided.

The various objects and features of this invention will be fully understood from the following detailed description of the typical preferred form and application thereof, throughout which description reference is made to the accompanying drawings, in which:

FIG. 1 is a sectional view showing the doffer wheel of the present invention as it is related to a cotton picking spindle.

FIG. 2 is a view taken as indicated by line 2—2 on FIG. 1.

FIG. 3 is an enlarged detailed section of a portion of the structure taken as indicated by line 3—3 on FIG. 2.

FIG. 4 is a fragmentary perspective view of one of the lugs of the doffer wheel as provided by the present invention.

The present invention involves the withdrawal of cotton fibers from the picking spindles of a cotton picking machine, and therefore, I have shown a typical relationship of parts that characterize a machine of the type under consideration. In the drawings, there is a spindle S for pulling cotton fibers from the plants, and there is a doffer wheel W for withdrawing the cotton fibers from the spindle. As shown, the wheel W has a flat marginal portion that carries lugs L which closely approach the picking surface of the spindle S. The spindle S rotates in order to have a picking action and the wheel W rotates at a greater peripheral speed than the spindle in order to unwrap the cotton fibers from said spindle. The said lugs L that characterize the wheel W are in a series and are circumferentially spaced, these lugs being formed of soft, pliant and resilient material, preferably rubber or the like. During the operation, the lugs L not only mechanically engage the cotton to draw it off the spindle S, but they act as fan blades to move air that operates to blow the cotton fibers radially away from the wheel W. Thus, the doffer wheel W acts to remove cotton fibers from the spindle S and to throw said fibers away from the spindle for subsequent pneumatic handling.

The doffer wheel W involves, generally, a disc A carried by a hub B, said disc supporting the series of circumferentially spaced lugs L. The disc A is essentially a flat and round element, the center portion thereof being dished in the particular case illustrated and enlarged to form the hub B. As shown, the hub B is driven on a shaft 10 disposed on an axis substantially normal to the axis of the spindle S and so that the marginal portion 11 of the wheel W lies adjacent the spindle. Said portion 11 is machined flat in a plane normal to the axis of the wheel and it is an annular surface, as indicated.

In accordance with doffer wheel construction, there is an annular body 12 of rubber, or the like, that overlies and is vulcanized or otherwise adhered to the portion 11. The body 12 is not too great in thickness, however, it is substantially thickened so as to endure reasonable wear. In any case, the lugs L are integral with the body 12, being simultaneously molded therewith and so that there is continuity of attachment from lug to lug and throughout the circumference of the wheel W. As I have illustrated, there can be approximately eight lugs L, and each lug is a radially disposed element that projects axially from the marginal portion 11.

The lugs L are alike and each comprises a solid projecting portion of the soft, pliant and resilient body 12. As best illustrated in FIG. 4, the lug L has a flat top 15 spaced from and parallel to the plane of the portion 11, its sides 16 extending between the body 12 and top 15. It has a back end 17 defining the peripheral extent of the lug L and it has a front nose 18 at the radially inward end of the lug. The sides 16 are somewhat convergent as they extend to the top 15, while the back end 17 is normal and coincidental with the periphery of the wheel. The nose 18 is slanted as are the sides 16 and extend generally toward the disc portion 11 and radially inward. In accordance with the invention, the inclination of the nose 18 is substantial, being pitched or slanted at about 60°, as shown. Further, the nose 18 is convexly rounded and so as to curve between the two opposite sides 16, and to fair into said two sides.

With the lugs L as thus far described there are sharp corners defined by the joinder of the sides 16, end 17 and nose 18 with the top 15. However, and in accordance with the present invention, the joinder of the sides 16 and nose 18 with the body 12 is other than sharp. As is clearly shown, the joinder of the lug L with the body 12, at what I will term the inside corners, is through a rounded fillet 25 of substantial radius, to the end that the lug L gently fairs into the body 12. As shown, the fillet 25 fairs tangentially from the body 12 and into the sides 16 and rounded nose 18, said fillet being of constant radius or cross-section.

From the foregoing, it will be aparent that there are no sharp inside corners remaining in the lug structure of the present invention, and that there are no cavities formed or interstices into which cotton fibers and foreign material can be packed. Consequently fracturing and tearing off of lugs is virtually eliminated, and any and all cotton fibers are deflected and guided by the fillet 25 to move over and onto the smooth and slanted sides 16 and nose 18 and thereafter slide freely and are discharged from the doffer wheel. Without the deposit of cotton fibers on the wheel there can be no collection of dirt nor the collection of oils and wetting agents and the like. Finally, it is apparent that there will be no collection of foreign materials that ordinarily become dirty and contaminate the cotton and there will be no discolored cotton found in the completed bales and which would result in downgrading of said bales and lowering in the selling price thereof.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. A doffer wheel for removing cotton fibers from the picking spindle of a cotton picking machine and including, a disc carried by a central hub and having an annular marginal portion in a plane normal to the axis of rotation, an annular body of rubber-like material bonded to the disc to overlie the said marginal portion, and radially disposed lugs formed on said body to project axially therefrom and with a top spaced from said body and each with sides and a slanted nose at the radially inward end thereof, said nose extending axially and radially inward between the top and body, and said nose having a filleted corner where it adjoins and fairs into said body.

2. A doffer wheel for removing cotton fibers from the picking spindle of a cotton picking machine and including, a disc carried by a central hub and having an annular marginal portion in a plane normal to the axis of rotation, an annular body of rubber-like material bonded to the disc to overlie the said marginal portion, and radially disposed lugs formed on said body to project axially therefrom and with a top spaced from said body and each with sides and a slanted and convexly rounded nose at the radially inward end thereof, said nose extending axially and radially inward between the top and body, and said nose having a filleted corner where it adjoins and fairs into said body.

3. A doffer wheel for removing cotton fibers from the picking spindle of a cotton picking machine and including, a disc carried by a central hub and having an annular marginal portion in a plane normal to the axis of rotation, an annular body of rubber-like material bonded to the disc to overlie the said marginal portion, and lugs formed on said body to project axially therefrom and with a slanted nose faced radially inward, and said nose having a filleted corner where said nose adjoins and projects from said body and is flowingly curved to fair with the body and with the lug.

4. A doffer wheel for removing cotton fibers from the picking spindle of a cotton picking machine and including, a disc carried by a central hub and having an annular marginal portion in a plane normal to the axis of rotation, an annular body of rubber-like material bonded to the disc to overlie the said marginal portion, and lugs formed on said body to project axially therefrom and with a slanted and convexly rounded nose faced radially inward, and said nose having a filleted corner where said nose adjoins and projects from said body and is flowingly curved to fair with the body and with the lugs.

References Cited in the file of this patent

UNITED STATES PATENTS

| 2,654,202 | Millard | Oct. 6, 1953 |
| 2,830,426 | Bornzin et al. | Apr. 15, 1958 |
| 2,847,815 | Radow et al. | Aug. 19, 1958 |